March 18, 1924.
J. H. MINER ET AL
1,487,589
MACHINE FOR MILLING TOOTH SOCKETS IN SAW BLADES
Filed July 31, 1920
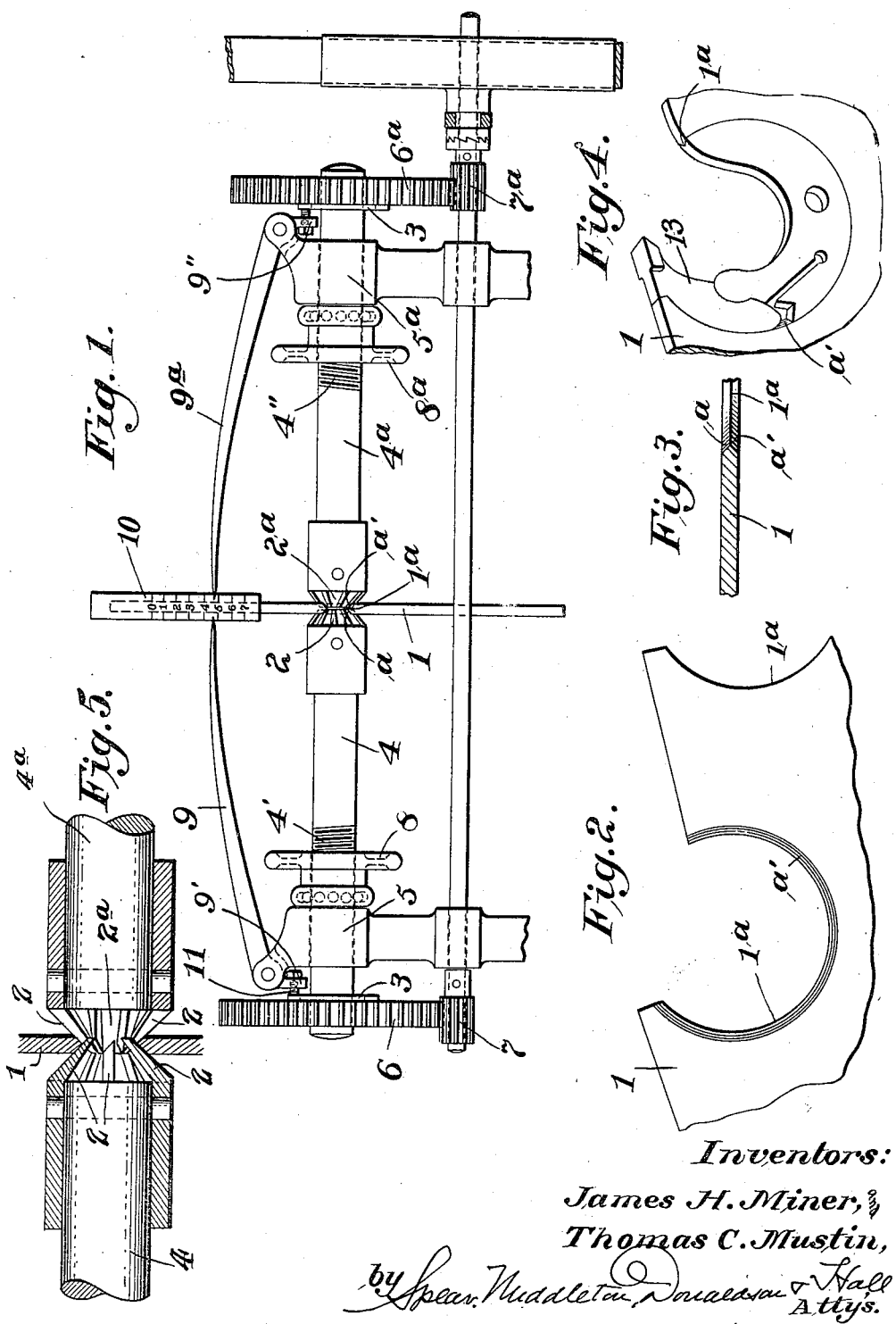
Inventors:
James H. Miner,
Thomas C. Mustin,
by Spear, Middleton, Donaldson & Hall
Attys.

Patented Mar. 18, 1924.

1,487,589

UNITED STATES PATENT OFFICE.

JAMES H. MINER AND THOMAS C. MUSTIN, OF MERIDIAN, MISSISSIPPI.

MACHINE FOR MILLING TOOTH SOCKETS IN SAW BLADES.

Application filed July 31, 1920. Serial No. 400,344.

*To all whom it may concern:*

Be it known that we, JAMES H. MINER and THOMAS C. MUSTIN, citizens of the United States of America, and residents of Meridian, in the county of Lauderdale and State of Mississippi, have invented certain new and useful Improvements in Machines for Milling Tooth Sockets in Saw Blades, of which the following is a specification.

Our present invention relates to improvements in machines for milling the blades of circular saws to provide the recesses of the proper size and shape to receive insertible or changeable saw teeth, and aims to provide means by which the recesses may be accurately milled without the provision of fixed stops and in which the precise degree of milling may be observed as it progresses.

The invention further aims to provide means which may be operated to secure uniform cutting of the sockets or recesses, notwithstanding wear on the cutters, such wear, in machines heretofore constructed with fixed stops for limiting the movement of the cutters causing unequal sockets or recesses as the cutters become worn in use.

With these and other objects in view the invention includes the novel features of construction and arrangement and combination of parts hereinafter described and particularly defined by the appended claims.

An embodiment of our invention is illustrated in the accompanying drawing, in which;

Figure 1 is a side elevation, largely of a conventional nature showing a sufficient portion of a milling machine to illustrate the invention, and Fig. 2 is a detail view on a larger scale showing one of the milled sockets or recesses.

Figs. 3 and 4 are detail views relative to the saw.

Fig. 5 is a detail view of the cutting teeth.

Referring by reference characters to this drawing the numeral 1 designates the saw blade and 2, $2^a$ a pair of opposed milling cutters designed to cut the circular recess $1^a$ in the saw blade to receive the insertible teeth 13. These teeth are provided with V-shaped channels or grooves in their curved or outer edge and the curved wall of the recesses must be milled with reversely beveled faces $a$ and $a'$ to form an edge substantially wedge-shape in cross section to fit the curved wall of the tooth. The cutters are therefore provided with inclined or converging cutting teeth as shown and the teeth of one cutter are staggered in relation to the teeth of the other cutter to permit them to pass by each other as the cutters are fed towards each other, in the manner well understood by those skilled in the art and as disclosed for example in Fig. 3 in Letters Patent of the United States granted to one Hawkins, October 31, 1871, No. 120,433.

The saw may be supported in any suitable manner well understood by those skilled in the art so as to be intermittently rotated to bring the successive portions to be milled into alignment with the cutters.

The cutters are mounted on shafts 4 and $4^a$ which are journaled in suitable bearings 5 and $5^a$ so as to be longitudinally movable therein as well as rotatable to permit the movement of the cutters towards and from each other as above described. The cutter shafts may be driven by any suitable means as for instance by providing them with gears 6 and $6^a$ which mesh with driving pinions 7 and $7^a$, the teeth of which are wide enough to permit of the axial movement of the gears 6 and $6^a$ from disengaging them from the driving gears. Said driving gears may be driven in any suitable manner from any suitable source of power. In order to secure endwise movement of the shafts we provide them with right and left hand threaded portions 4' and 4'' which are engaged by the threaded hubs of hand wheels 8 and $8^a$, these hubs being held against sidewise movement by rotatable engagement with the machine frame. It will be understood that if unrestrained the hand wheels 8 and $8^a$ will revolve with the shafts 4 and $4^a$, at which time the shafts will not be fed longitudinally. To feed the shafts, and hence the cutters, it is only necessary to stop or retard the rotation of the hand wheels by the pressure or grasp of the hands, which will cause the feed of the shafts towards each other, due to the right and left hand threads shown, the hubs of the hand wheels abutting preferably by anti-friction bearings against the frame or bearing parts 5 and $5^a$. Upon removal of the hands from the hand wheels, these will be free to revolve with the shafts and the feed will be stopped.

9 and $9^a$ designate a pair of indicating arms pivotally supported from or fulcrumed on the bearing members 5 and $5^a$ and having pointed ends designed to cooperate with a scale 10 having suitable scale marks and numerals thereon. The indicating arms are provided with short portions 9′ and 99′ on opposite sides of their respective pivots, in effect constituting bell crank levers, the short arms of which are arranged to bear on annular accurately turned bearing portions of the faces of gears 6 and 6ª. A set screw 11 is threaded through each short arm and designed to coact with the bearing surfaces of the gears whereby independent adjustment of the indicator arms may be effected. The screws will be held in contact with the gear faces by the attraction of gravity on the long arms.

By this arrangement the gradual feeding of the shafts toward each other will swing the bell crank levers and cause the indicating arms to move simultaneously over the scale with a greatly amplified movement. The degree of cutting of the cutters may therefore be accurately noted, and in the cutting of successive sockets the cutters being stopped, when the indicator arms reach a predetermined figure on the scale, it will be seen that the sockets will all be milled to exactly the same degree, or as close as one one-thousandth (1/1000) of an inch as the cutters wear, which they will on highly tempered saws, the operator can feed a fraction more, say one two-thousandths (1/2000) of an inch to compensate for the wear. For example, if the parts are adjusted so that the numeral 4 on the gage would indicate the completion of the milling operation (such setting being accomplished in connection with the first socket by using a master template or pattern) and if it is found that the cutters are wearing, the operator can increase the feed for each successive socket to compensate for the wear, it being understood that the operator would use the template to test and vary the feed accordingly.

Having thus described our invention, what we claim is:

1. In a milling machine for milling sockets in saw blades to receive insertible or removable teeth, the combination with a pair of lengthwise movable shafts and milling cutters carried thereby of indicator means associated with each shaft and arranged to be moved by the lengthwise movement of such shaft.

2. In a milling machine for milling sockets in saw blades to receive insertible or removable teeth, the combination with a pair of lengthwise movable shafts and milling cutters carried thereby, of indicator arms pivoted on fixed axes, said arms having long portions cooperating with a scale and short portions arranged to be moved by the movement of the shafts.

3. In a milling machine for milling sockets in saw blades, a longitudinally movable shaft carrying a milling tool, an annular abutment member carried by said shaft and having an accurately trued face, a two-armed lever fulcrumed on a fixed pivot and having a short arm in juxtaposition to said abutment member, and a long arm provided with an indicating end or pointer, and a scale cooperating with said pointer.

4. In a milling machine for milling sockets in saw blades, a longitudinally movable shaft carrying a milling tool, an annular abutment member carried by said shaft and having an accurately trued face, a two-armed lever fulcrumed on a fixed pivot and having a short arm in juxtaposition to said abutment member, said short arm having an adjustable contact screw bearing on said abutment member, and a long arm provided with an indicating end or pointer, and a scale cooperating with said pointer.

5. In a milling machine for milling sockets in saw blades, a rotary shaft carrying a milling cutter and arranged to be movable towards and from the saw, a scale, a two-armed lever fulcrumed on a fixed support and having a long arm cooperating with the scale, and a short arm, and means whereby the movement of the shaft towards the saw operates said short arm.

In testimony whereof, we affix our signatures.

JAMES H. MINER.
THOMAS C. MUSTIN.